United States Patent
Hjelm et al.

(10) Patent No.: US 9,104,229 B2
(45) Date of Patent: Aug. 11, 2015

(54) POLICY CONTROLLED PRELOAD AND CONSUMPTION OF SOFTWARE APPLICATION

(75) Inventors: Johan Hjelm, Tokyo (JP); Martin Svensson, Hagersten (SE); Nimish Radia, Dublin, CA (US)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 321 days.

(21) Appl. No.: 13/296,519

(22) Filed: Nov. 15, 2011

(65) Prior Publication Data
US 2013/0124673 A1    May 16, 2013

Related U.S. Application Data

(63) Continuation of application No. PCT/SE2011/051343, filed on Nov. 10, 2011.

(51) Int. Cl.
| | |
|---|---|
| *G06F 15/16* | (2006.01) |
| *G06F 15/173* | (2006.01) |
| *G06F 9/44* | (2006.01) |
| *H04L 12/00* | (2006.01) |
| *G06F 9/445* | (2006.01) |

(Continued)

(52) U.S. Cl.
CPC .. *G06F 8/00* (2013.01); *G06F 8/61* (2013.01); *H04L 12/00* (2013.01); *H04L 67/306* (2013.01); *H04L 67/34* (2013.01); *G06F 9/44505* (2013.01); *H04L 63/102* (2013.01)

(58) Field of Classification Search
USPC .................. 709/217, 203, 223, 224, 226
See application file for complete search history.

(56) References Cited

U.S. PATENT DOCUMENTS

| | | |
|---|---|---|
| 2003/0187984 A1 | 10/2003 | Banavar et al. |
| 2006/0277271 A1 | 12/2006 | Morse et al. |
| 2008/0005057 A1 | 1/2008 | Ozzie et al. |

(Continued)

FOREIGN PATENT DOCUMENTS

| | | |
|---|---|---|
| EP | 2237518 A1 | 10/2010 |
| WO | 2007110094 A1 | 10/2007 |

(Continued)

OTHER PUBLICATIONS

International Search Report and Written Opinion from International application No. PCT/SE2011/051343, dated Nov. 13, 2012, 17 pages.

*Primary Examiner* — Quang N Nguyen
(74) *Attorney, Agent, or Firm* — Patent Portfolio Builders, PLLC

(57) ABSTRACT

The present disclosure relates to interrelated methods in a server and in a client enabling policy controlled preload and consumption of software application in a client. The method in a server comprises receiving information pertaining to an identified user; providing the identified user's current user and/or software application usage policies to a client associated with the identified user; deriving an software application preferences context pertaining to the user; based on the derived software application preferences context recommending an unsolicited software application from a set of available software applications; and preparing for transmission a set of software application comprising the recommended unsolicited software application; and transmitting to the client the prepared set of software applications. The method further relates to a server, a client, a computer program on a carrier and a computer program product.

13 Claims, 4 Drawing Sheets

(51) Int. Cl.
*H04L 29/08* (2006.01)
*H04L 29/06* (2006.01)

(56) References Cited

U.S. PATENT DOCUMENTS

2009/0265754 A1 10/2009 Hinds
2010/0088316 A1 4/2010 Robinson et al.
2010/0131313 A1* 5/2010 Hansknecht et al. ............. 705/7

FOREIGN PATENT DOCUMENTS

WO 2011073586 A1 6/2011
WO 2011123148 A1 10/2011

* cited by examiner

POLICY CONTROLLED PRELOAD AND CONSUMPTION OF SOFTWARE APPLICATION

This application is a continuation of International Patent Application No. PCT/SE2011/051343, which was filed on Nov. 10, 2011 and which designates the United States. The entire contents of the above identified application is incorporated by reference herein.

TECHNICAL FIELD

The present invention pertains in general to the field of software application preload and more particularly to interrelated methods in a server and in a client, for enabling policy controlled preload and consumption of a software application in a client.

BACKGROUND

Currently, software application providing "App Stores" such as e.g. the Ericsson Drutt Mobile Service Delivery Platform (MSDP) product, or federated stores as proposed in the Wholesale Applications Community (WAC) consortium are becoming popular. WAC's objective is to offer developers a route to market that reaches the widest possible customer base and provides customers with as much choice as possible.

Via the interface of a networked user device, a user can browse among applications available through a certain app store. When a desired application is selected among the available apps, also known as applications, a user authorization process is initiated and performed, after which the selected application may be downloaded to the user device.

Generally, an end-user may be aware of, and to a degree tolerate, the reason behind some delay forcing him or her to wait while downloading certain amount of content. However, the need to wait for download of what appears to be, and in fact is a limited amount of software application data is less intuitive, and therefore less tolerable from an end-user perspective, since the user authorization, although necessary and desirable from an app providers point of view, does not add to the user experience.

In current delivery systems for applications, authorization is performed after which the application is retrieved. The user has hence to wait for the application to be downloaded after the user has been authorized. This may hamper the user experience.

SUMMARY

It is an object to seek to mitigate, alleviate or eliminate one or more of the disadvantages above and provide improved methods, apparatuses and computer program products with which authorization is performed before a software application is retrieved.

A first aspect of the present disclosure is a method in a server. The method according to the first aspect of the disclosure is enabling policy controlled preload and consumption of software application in a client, and comprises the steps of: receiving information pertaining to an identified user; providing the identified user's current user- and/or application usage policies to a client associated with the identified user; deriving an software application preferences context pertaining to the user; based on the derived software application preferences context recommending an unsolicited software application from a set of available software application; preparing for transmission a set of software application comprising the recommended unsolicited app; and providing the client with the prepared set of apps.

The received information may comprise context information pertaining to the user. The received information may further comprise an instruction to provide the client with an unspecified unsolicited software application for download. The step of deriving may further comprise deriving the software application preferences context from meta-data pertaining to a user-solicited app. The step of deriving may further comprise deriving the software application preferences context from network-based context information pertaining to the user. The step of recommending may comprise the further step of computing relative software application preferences context relevance among a set of available software applications. The step of recommending may comprise the further step of selecting for recommendation the unsolicited software application having the highest relative software application preferences context relevance among previously not selected available software applications.

A second aspect of the present disclosure is a method in a client. The method according to the second aspect of the disclosure comprises the steps of: receiving information pertaining to an identified user; obtaining the identified user's current user- and/or application usage policies; providing to the network context information pertaining to the user from which an software application preferences context pertaining to the user may be derived; receiving a set of software applications comprising an unsolicited software application relevant to the user's software application preferences context; and storing the unsolicited software application in a preload cache.

The received information may comprise a request for a previously unsolicited app stored in a preload cache.

The method of the second aspect of the present disclosure may comprise the further steps of determining whether the requested software application is in accordance with the obtained current user- and or application usage policies; and if so providing the user with the requested app.

According to a method of the first and/or second aspects of the present disclosure the received information may comprise a request from the user for a user-solicited app.

According to the first and/or second aspects of the present disclosure the set of software applications may comprise the user-solicited app.

A third aspect of the present disclosure is a server for provision of policy controlled software application preload to a client. The server of the third aspect of the present disclosure comprises a network interface unit, a processing unit and a memory unit. The processing and memory units implement a preload manager, a recommender, and a software application storage, where said server is adapted and configured to receive information pertaining to an identified user; provide the identified user's current user- and/or application usage policies to a client associated with the identified user; derive a software application preferences context pertaining to the user; based on the derived software application preferences context recommend an unsolicited software application from a set of available software applications; prepare for transmission a set of software applications comprising the recommended unsolicited software application; and provide the client with the prepared set of software applications.

According to the third aspect of the present disclosure, the server may further be adapted and configured to derive the software application preferences context from meta-data pertaining to the user-solicited software application and/or from network-based context information pertaining to the user;

compute relative software application preferences context relevance among a set of available software applications; and select for recommendation the unsolicited software application having the highest relative software application preferences context relevance among previously not selected available software applications.

A fourth aspect of the present disclosure is a client. The client of the fourth aspect of the present disclosure comprises a network interface unit, a man-machine interface unit, a processing unit and a memory unit, said units implementing a user interface, a preload cache, a policy enforcement point, a policy storage and a context agent. The client of the fourth aspect of the present disclosure is further adapted and configured to receive information pertaining to an identified user; obtain the identified user's current user- and/or application usage policies; provide to the network context information pertaining to the user from which a software application preferences context pertaining to the user may be derived; receive a set of software applications comprising an unsolicited software application relevant to the user's software application preferences context; and store the unsolicited software application in the preload cache.

The received information may further comprise a request for a previously unsolicited software application stored in the preload cache.

The client of the fourth aspect of the present disclosure may further be adapted and configured to determine whether the requested software application is in accordance with the obtained current user- and or application usage policies; and if so provide the user with the requested software application.

A fifth aspect of the present disclosure is a computer program comprising program instructions for causing a computer to perform the method steps of the first or the second aspect of the present disclosure when said program is run on a computer.

A sixth aspect of the present disclosure is a computer program on a carrier and comprising computer executable instructions for causing a computer to perform the method steps of the first or the second aspect of the present disclosure, when said program is run on a computer. Said carrier may be a record medium, computer memory, read-only memory or an electrical carrier signal.

A seventh aspect of the present disclosure is a computer program product comprising a computer readable medium, having thereon: computer program code means, when said program is loaded, to make the computer execute the process of any of the first or the second aspect of the present disclosure.

Embodiments of the present disclosure have an advantage that authorization of a user is performed before a software application is retrieved to the user. This means that the user may benefit from immediate access to the software application after the download.

BRIEF DESCRIPTION OF DRAWINGS

These and other aspects, features and advantages of which the present disclosure is capable of, will be apparent and elucidated from the following description of embodiments of the present disclosure, reference being made to the accompanying drawings, in which.

DETAILED DESCRIPTION

Embodiments of the present disclosure can overcome the disadvantages described above by combining a control of an intermediate software application storage, also named preload cache, in a user's device which receives software applications for download, with software application store functionality, enabled by the delegation of policy control. Examples of software application store functionality are provided by the functionality provided by known "App Stores".

A service node such as the Ericsson Drutt Mobile Service Delivery Platform (MSDP) may be responsible for requesting recommendations of items to a user.

The software application store is equipped with a recommendation system that creates a user-specific list of appropriate software applications or media; a mechanism to manage downloads appropriately for a current network and device conditions; and a policy management mechanism which makes the configuration of the policies individual for each user.

Figure 1:
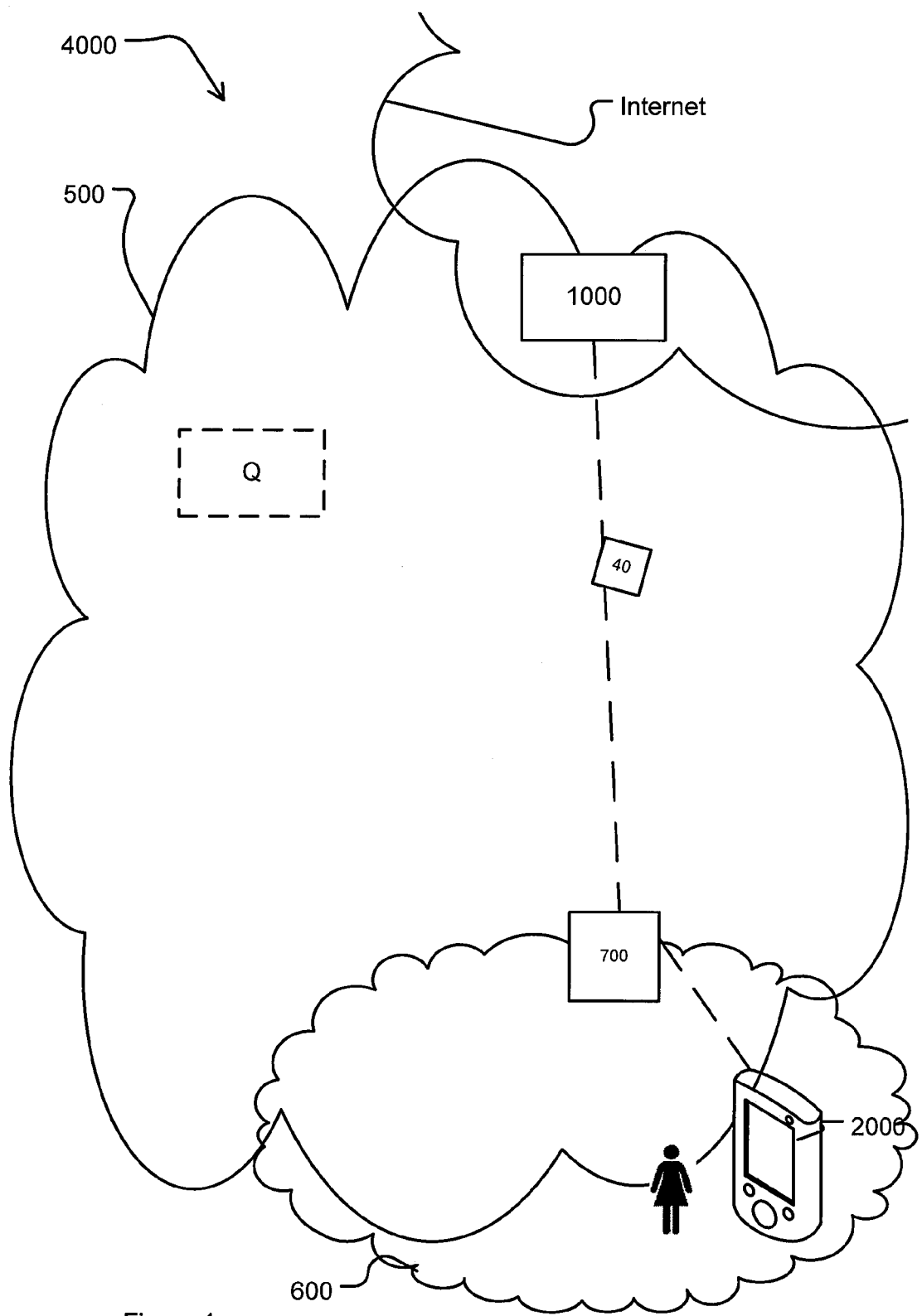
FIG. 1 illustrates a communication system, related to the present disclosure.

Embodiments of aspects of the present disclosure may be implemented in a system as described in FIG. 1. The system 4000 comprises a first network 500, which may be a core network, and a second network 600, which may be a radio access network.

The radio access network may be standardized by IEEE, 3GPP or 3GPP2 and may comprise a radio access node 700. The system further comprises a software application store server 1000 connectable to the core network 500 and, directly or indirectly via the core network 500, to the radio access network 600.

The core network 500 may be implemented according to the standards from IEEE, ETSI, 3GPP or 3GPP2 for connecting a radio access network to other communications networks. The core network 500 may further be adapted and configured to provide device group functionality, context manager functionality and network control functionality.

The system according to embodiments of the present disclosure may also comprise a social network services functionality, implemented as connectable to the first and/or second networks 500, 600.

The system further comprises a client 2000, herein exemplified as a mobile device 2000, connectable to the radio access network, and further via it connectable to the core network 500 and to the software application store server 1000.

Via the mobile device 2000 a user may get immediate access to one or many software applications or "apps" previously preloaded in a preload cache comprised in the mobile device 2000.

For the purpose of the present disclosure an "app" is a software application of the form of a self-contained bundle of media and/or instructions that are intended for local installation on a mobile device, such that an end-user may utilize functionality provided by the software application.

Throughout the figures, logical/functional entities implemented by hardware and/or software comprised in system nodes are illustrated as boxes with dashed borders and referenced with capital letters rather than numbers. Though the dashed boxes in the figures are not explicitly connected by lines, it is to be understood that the respective logical/functional entities are implemented as interconnected to function according to embodiments of the present disclosure.

As illustrated in FIG. 1, the core network 500 comprises a context manager Q that is adapted and configured to manage user context.

For the purpose of the present disclosure, "user context" is defined as a descriptor of a user's current situation. User context may provide information about a user's current location, current device usage etc. A user context may be derived from context related data retrieved from various sources and sensors, etc. as is described in the state of the art. The context manager Q is further adapted and configured to manage user preferences.

For the purpose of this present disclosure, "user preferences" is defined as a descriptor of the user per se as a function of time. Notably, user preferences pertaining to a certain user may be influenced by at least aspects of the same certain user's current and previous user contexts.

Figure 2A:
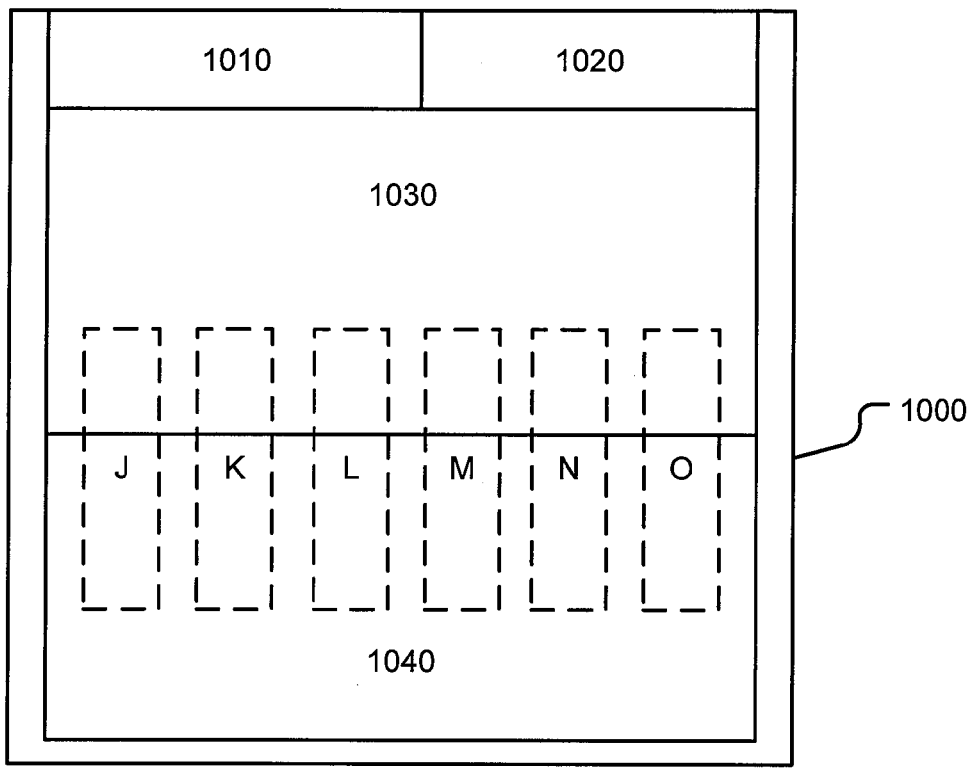
FIGS. 2a and 2b schematically illustrate embodiments of a server and a client according to aspects of the present disclosure.

An application store server 1000 according to some embodiments of the present disclosure will now be described in relation to FIG. 2. The application store server 1000 comprises a network interface unit 1010 adapted and configured to enable the application store server 1000 to interact with and via the core network 500, i.e. with and through other entities or servers in the core network. The application store server 1000 further comprises a network interface 1020 towards a public network, such as the Internet. Via the network interfaces 1010, 1020, the application store server 1000 is adapted to communicate with other nodes in the system 4000, and with network operators, authentication providers, content providers etc.

The application store server 1000 further comprises a processing unit 1030 and a memory unit 1040. The processing unit 1030 and memory unit 1040 implements a policy server J, a preload manager K, a recommender L and a software application storage M and all processing, computing and storage functionality necessary to enable embodiments of the present disclosure.

The policy server J is adapted and configured to handle, and to delegate, centrally managed application subscriptions, usage rights and policies information. The policy server J may further be adapted and configured to provide and apply digital rights management (DRM) in a DRM server.

The preload manager K is adapted and configured to handle the distribution, packaging and caching/storage of software applications which may be delivered to the mobile device 2000.

The recommender L is adapted and configured to select a set of apps to be managed by the preload manager K. The software application storage M is adapted and configured to store and prepare for transmission, and thus make apps 40 available for installation and execution in a client.

According to embodiments of the present disclosure an account/subscription manager N is implemented and further adapted and configured to manage information about users' allowances for app usage, which may be triggered by payment or other mechanism-based usage authorization.

According to embodiments of the present disclosure a campaign manager O is implemented as comprised in the recommender L. The campaign manager O may be adapted and configured to comprise and/or manage information about which apps 40 should be promoted towards the user.

Figure 2B:
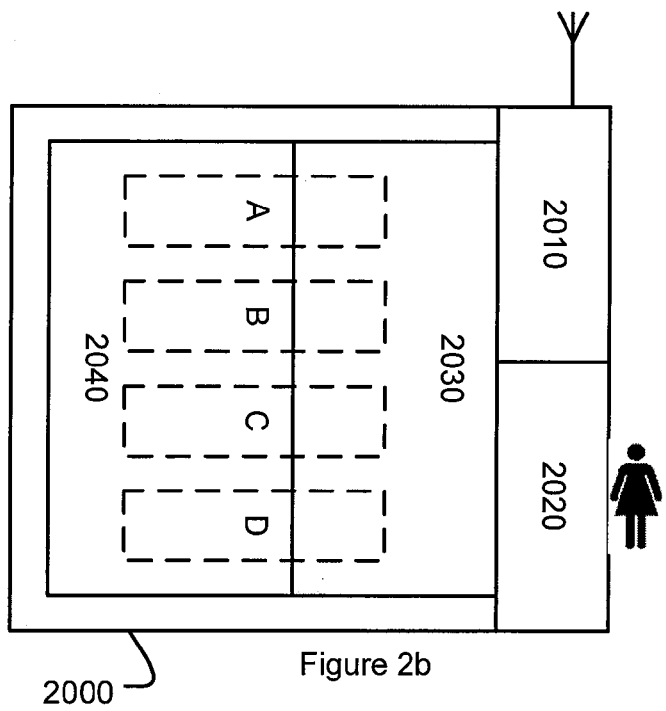

A user device 2000 as one realization of a client 2000 according to embodiments of the present disclosure will now be described in relation to FIG. 2b. The user device 2000 may be a stationary, nomadic or mobile user device 2000, such as for instance a mobile phone. The user device 2000 comprises a network interface unit 2010 and a man-machine interface unit 2020. The network interface unit 2010 is adapted to provide network connectivity to the second network 600 and further via the second network 600 to the first network 500 and to the Internet. The network interface unit 2010 comprises a radio transceiver. In other client embodiments, other network interfaces, such as wired networks, optical networks, or other technologies are possible.

The user device 2000 further comprises a processing unit 2030 and a memory unit 2040. The processing and memory units 2030 and 2040 implement a preload cache A, a context agent B, a policy storage C and a policy enforcement point D, each enabling embodiments of the present disclosure. The preload cache A is adapted and configured to store and manage apps that have been prepared for transmission by the server 1000, so as to be delivered to the user. During streaming from the server 1000 to the client 2000, preloading or not, the apps are routed via the preload cache A.

The policy storage C is adapted and configured to manage policies related to subscription, usage and/or caching of software applications. The policy enforcement point D is adapted and configured to execute policies delegated from the server 1000, thereby enabling e.g. conditional installation and/or usage of an app.

The context agent B is adapted and configured to collect, assemble and manage contextual and preferential data, such as a user's behavior, interaction and media usage; sensor data, e.g. data about the situation around a user; and device capabilities, describing how a user device may be used.

Further, the man-machine interface 2020 may comprise a microphone, a speaker, a display and further any other component necessary to enable a user to view, hear, feel, read, sense, interact/impart to, or in other ways utilize and exploit features and advantages of the installed software application. The client 2000 is associable with an identified user.

Figure 3:
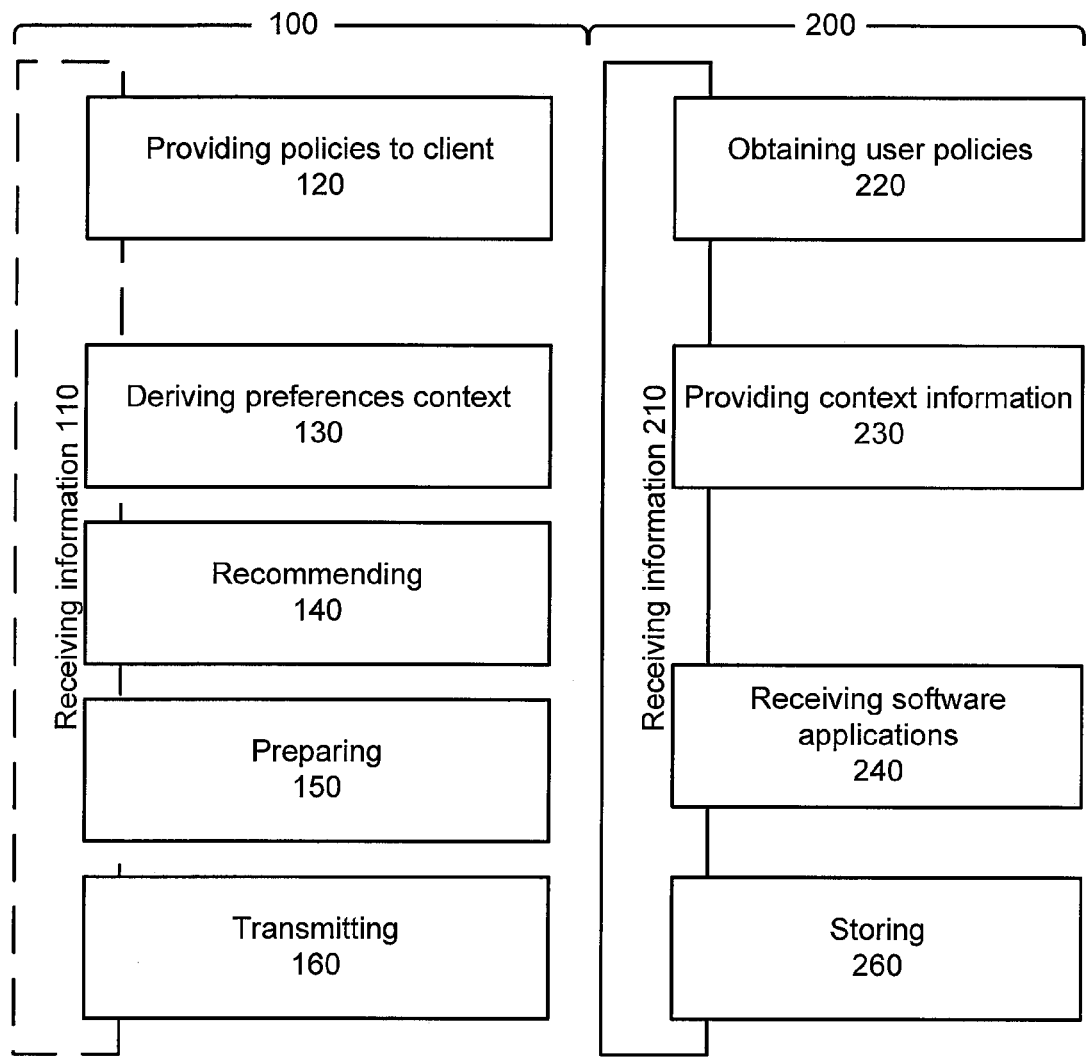
FIG. 3 schematically illustrates flowcharts of methods according to embodiments of the present disclosure.

FIG. 3 illustrates a method 100 in a server 1000 and a method 200 in a client 2000, according to embodiments of the present disclosure, in a flowchart type of presentation. Said methods are interrelated.

The method 100 in a server 1000 enables policy controlled preload of software application and consumption in a client 2000 that is associated with an identified user 10. The method 100 comprises providing 120 the identified user's 10 current user- and/or software application usage policies to the client 2000 and deriving 130 a software application preferences context pertaining to the identified user 10. The method further comprises based on the derived software application preferences context, recommending 140 an unsolicited software application 20 from a set of available software applications 30, and preparing 150 a set of software applications 40 for transmission, the set of software applications comprising the recommended unsolicited software application 20. In addition, the method 100 comprises transmitting 160 to the client 2000 the prepared set of software applications 40.

The method 100 may further comprise receiving information 110 pertaining to an identified user 10.

The method 200 in a client 2000 that is associated with an identified user 10, comprises receiving information 210 pertaining to an identified user 10, where the information comprises context information pertaining to the user 10, and obtaining 220 the identified user's 10 current user- and/or application usage policies. The method 200 also comprises providing 230 to a server, context information pertaining to the user 10 from which an software application preferences context pertaining to the user 10 may be derived, and receiving 240 a set of software applications 40 comprising an unsolicited software application 20 relevant to the user's software application preferences context. In addition, the method comprises storing 260 the unsolicited software application 20 in a preload cache.

In the following, an interleaved discussion of method steps of methods 100 and 200 is presented.

According to some embodiments, the method in a server 1000 comprises the step 110 of receiving information pertaining to the identified user. An instruction to the client 2000 to request a user-relevant app for preload may originate from an app provider. The received information then comprises or is comprised in the request from the client 2000 associated with the user. An interrelated method step 210 may comprise receiving information in the form of said instruction.

The method 100 further comprises a providing step 120. In this step, the server 1000 provides the identified user's current user- and/or software application usage policies to the client 2000. Correspondingly, the same policies are obtained by the client 2000 in an interrelated method step 220. The providing step 120 enables the determining step 270.

In a deriving step 130, the server 1000 derives app preferences context pertaining to the identified user.

Based on the derived app preferences context, the recommender L recommends an unsolicited app 20 from a set of available apps 30 in the application storage M. This is performed in a recommending step 140.

In the following, reference is also made to FIG. 4 in order to avoid repetition of paragraphs of the present disclosure.

Figure 4:
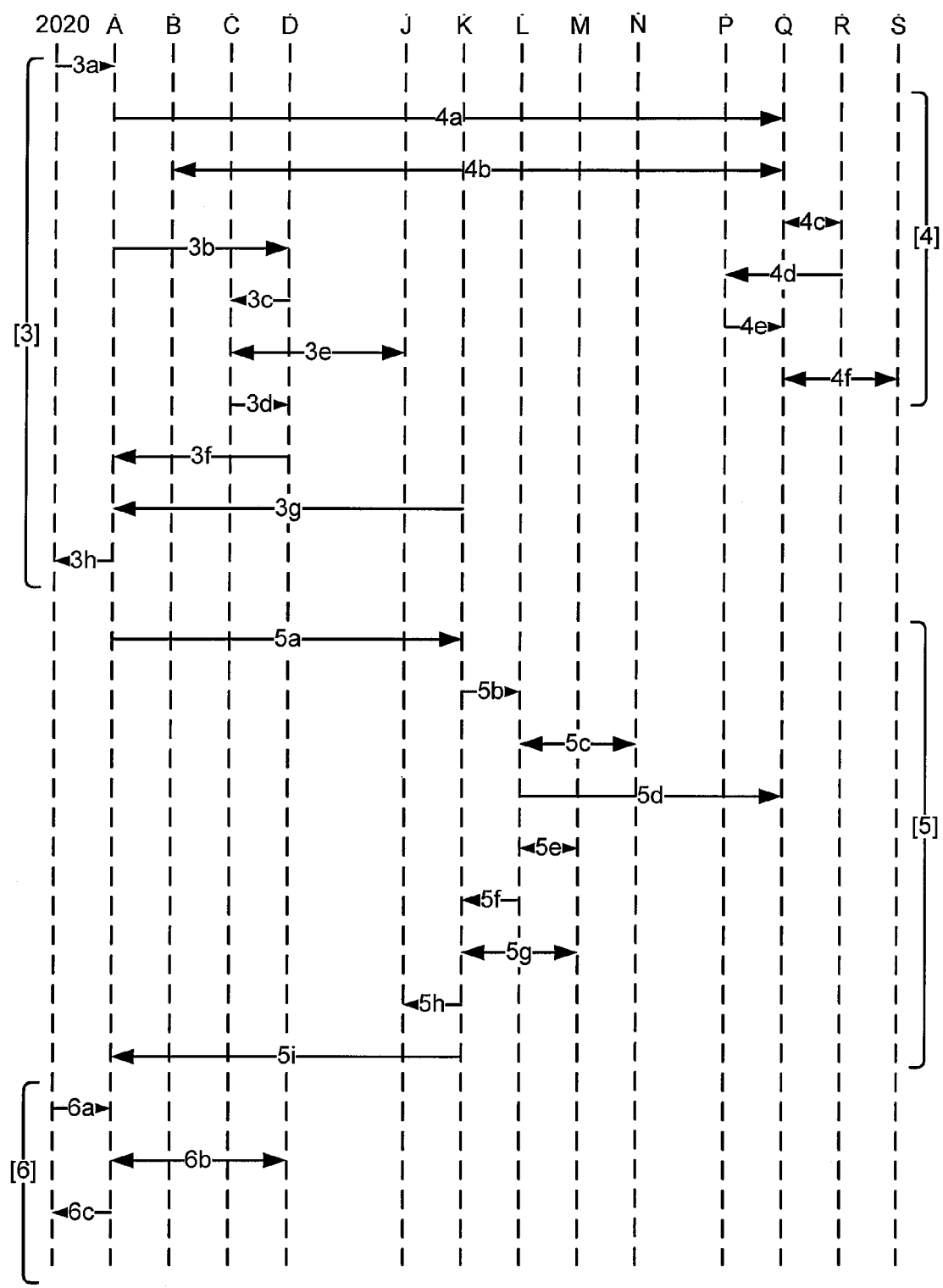
FIG. 4 illustrates sequences relating to methods according to embodiments of the present disclosure.

FIG. 4 illustrates sequences related to embodiments of the methods of FIG. 3. Said FIG. 4 illustrates the principles of a policy setup sequence [3], a context setup sequence [4], a preload setup sequence [5] and an app loading sequence [6], the sequences [3]-[6] of which are interrelated sequences related to the present disclosure.

Sequence events 3g, 3h, 5i and 6c, illustrated by relatively fatter arrows, entail downloading/streaming of actual content, in this case apps. Though the present disclosure also entails management of content/apps within the server, especially between the software application storage M and the preload manager K, this is implicit from the description and is therefore not explicitly denoted in the figures, for the sake of clarity.

The app provider initiates the service, but typically does not specify the identity of apps for preload. Instead the app provider may rely upon the recommender L to select and specify the identity of apps for preload. Further, the recommender L's selection is a function of user preferences. However, whereas the user may, with certain likelihood, be expected to request use of preloaded apps, the preloaded apps are nevertheless unsolicited from a user perspective at the time of preload.

In embodiments of the present disclosure, a context management sequence, as illustrated with the sequence events 4b-4f in FIG. 4, has been performed prior to the deriving step 130, as a part of an interrelated method step 230 in the client 2000. In the interrelated method step 230, the client provides the network with user context information from which the app preferences may be derived. According to embodiments of aspects of the present disclosure, the context manager Q retrieves user context from context agent B in sequence event 4b. This process may use policies and other tools for optimal data communication. In sequence event 4c, the context manager Q may retrieve network information from a network manager R. In sequence event 4d the network manager R may report the current network situation to a group manager P comprised in the core network. The group manager P may conclude a current group based on group membership list and network information. The group list is set externally and dependent on context information. The group manager P then reports, in sequence event 4e, the current group to the context manager Q. In sequence event 4f, the context manager Q may retrieve external relevant information, such as the identified user's social relations from a social network services S before it concludes the creation of the context. The deriving step 130 may be prompted by preload cache A, as illustrated in the sequence event 4a.

According to embodiments of the present disclosure, the recommender L may retrieve user information from the account manager N as illustrated by sequence event 5c. The user information may then be used to retrieve context information from Context Manager Q. This is illustrated in the sequence event 5d in FIG. 4.

During the recommendation step 140, the recommender L checks the availability of applications, and their metadata, in the application storage M, as illustrated by sequence event 5e; computes the most relevant applications for preloading; and, as illustrated by sequence event 5f, provides the list to the preload Manager K.

In a preparation step 150, the preload manager K retrieves the listed set of applications from the application storage M. This is illustrated by sequence event 5g. The preload manager K uploads the recommended application files to the client in transmitting 160 and is further illustrated by sequence event 5i. In certain embodiments of the present disclosure the server may, in a policing step 170, determine whether the policies allow use. The policing step 170 may be comprised in the preparation step 150.

The preload manager K may then check the user policy in the policy server J as illustrated by sequence event 5h, and further only allow delivery of apps to the client if the current user policies allow. This is an additional advantage, because app delivery will only take place when the user is ready to receive it; and only apps which the user has declared he is ready to receive is delivered. In situations where the user is not the subscriber, the user policy may be set by the subscriber, so that the person actually using the device, e.g. a child or an employee, does not perform downloads that are not permitted by the owner of the device, e.g. a parent or an employer. An optional mechanism for determining when it is necessary to check policies may be comprised in the preparation step 150.

In a receiving step 250 interrelated to the preparation step 150, the client 2000 receives the set of apps 40 comprising an unsolicited app 20 relevant to the user's app preferences context. In a storing step 260 interrelated to the providing step 160, received apps are stored in the preload cache A. For the purpose of the present disclosure, the words "buffering" and "caching" may be considered to be hyponyms to "storing", and further "streaming", "downloading" and "preloading" may considered to be hyponyms to "providing".

In embodiments of the present disclosure, the received information of the receiving steps 110 and/or 210 may comprise, or be comprised in, a request from the user, via the user interface 2020, to the client 2000, for a new, user-solicited app. This is illustrated by sequence event 3a.

In embodiments of methods 100 and 200 this request for a solicited app may serve as an alternative to the previously mentioned instruction from the service provider, and hence the request in the client 2000 may trigger initiation of the preload service.

In yet other embodiments the received information comprises or is comprised in a request via the user interface 2020 for an apparently "new" but in fact preloaded app that is already available within the client. A prerequisite for this is that the client has already been trusted with delegated policies in a previous obtaining step 220, and further illustrated by sequence events 3*b* to 3*f* of FIG. 4. Sequence event 3*b* illustrates that the preload cache A requests policy enforcement point D to check whether usage is allowed. Sequence event 3*c* illustrates how policy enforcement point D requests current user policies from the policy storage C. Sequence event 3*d* illustrates that policy storage C returns the policies to the policy enforcement point D. If the policy storage C does not have any current policies, it acquires it from policy server J as illustrated by 3*e*. Policy storage C may not have current policies, either because it has not previously received any, or because the received policies are older than a certain predefined age, or for another predetermined reason. The client 2000 determines in a determining step 270 whether the apparently new app is in accordance with the obtained policies prior to loading/installing/executing/rendering it for consumption via the user interface. This is illustrated in sequence events 6*a*, 6*b* and 6*c*.

It should be noted that the interrelated method step may be performed in different order, and certain interrelated method steps may be performed several times. The presented server-client relation should not be construed as reflecting a plain sender-receiver type of relationship between the server 1000 and the client 2000. Instead, they may be thought of as reflecting the same enabling method step concept performed with a first timing, order of sequence and set of interfaces in the server, and a second timing order of sequences and set of interfaces in the client. As an example, from the server's point of view, the final destination for the recommended apps is the client, whereas from the client's point of view, the end destination is the preload cache A within the same client. Further, whereas the server may determine whether the policies allow use during a policing step 170, comprised in the preparation step 150, the client may perform the corresponding determining during the determination step 270. Further, the client may receive information pertaining to the user from the user interface and/or from the context manager Q, while the server may receive the interrelated information from the client and/or from the context manager Q.

Embodiments of the present disclosure have the advantage that authorization of a user is performed before an application is retrieved to the user. This means that the user may benefit from immediate access to the application after the application has been downloaded.

The invention claimed is:

1. A method in a server for enabling policy controlled preloading and consumption of a software application to a client device that is being used by or that is owned by an identified user, comprising:
    providing the identified user's current user policy or the identified user's software application usage policy to the client device, wherein the current user policy or the software application usage policy identifies one or more conditions for installation of a set of available software applications;
    deriving a software application preferences context from metadata pertaining to user-solicited software application or from network-based context information pertaining to the identified user;
    based on the derived software application preferences context pertaining to the identified user that is using or that owns the client device, recommending an unsolicited software application for the client device from the set of available software applications;
    prepare a set of software applications for transmission, the set of software applications comprising the recommended unsolicited software application; and
    transmit to the client device the prepared set of software applications;
    wherein the recommending comprises computing relative software application preferences context relevance among a set of available software applications and selecting for recommendation an unsolicited software application having the highest relative software application preferences context relevance among previously unselected available software applications.

2. The method according to claim 1, further comprising receiving context information pertaining to the user.

3. The method according to claim 1, further comprising receiving an instruction to transmit to the client device an unspecified, unsolicited software application.

4. The method according to claim 1, further comprising receiving information having a user request for a user-solicited software application.

5. The method according to claim 4, wherein the prepared set of software applications comprises the user-solicited software application.

6. The method according to claim 1, wherein the current user policy and the software application usage policy identify one or more conditions for installation of the set of available software applications.

7. A method in a client device that is being used by or that is owned by an identified user, the method comprising:
    receiving information pertaining to the identified user, the information comprising context information pertaining to the identified user;
    obtaining the identified user's current user policy or the identified user's software application usage policy, wherein the current user policy or the software application usage policy identifies one or more conditions for installation of a set of available software applications;
    providing, to a server, the context information pertaining to the identified user from which a software application preferences context pertaining to the identified user is derived;
    receiving, at the client device being used by or owned by the identified user, the set of available software applications comprising an unsolicited software application relevant to the identified user's software application preferences context;
    storing the unsolicited software application in a preload cache;
    wherein the receiving information comprises receiving a request for a previously unsolicited software application stored in the preload cache;
    determining whether a requested software application is in accordance with the obtained current user policy or software application usage policy; and, in response to determining that the requested software application is in accordance with the obtained current user policy or software application usage policy, enabling the installation or preloading of the requested software application.

8. The method according to claim 7, wherein the received information comprises a request from the user for a user-solicited software application.

9. The method according to claim 8, wherein the received set of software applications comprises the user-solicited software application.

10. A server for provisioning of policy controlled preloading of a software application to a client device that is being used by or that is owned by an identified user, the server comprising:

a network interface unit, a processing unit and a memory unit, said units implementing a preload manager, a recommender, and a software application storage;
said server being adapted and configured to:
provide the identified user's current user policy or the identified user's software application usage policy to the client device, wherein the current user policy or the software application usage policy identifies one or more conditions for installation of a set of available software applications;
derive a software application preferences context from metadata pertaining to user-solicited software application or from network-based context information pertaining to the identified user;
based on the derived software application preferences context pertaining to the identified user that is using or that owns the client device, recommend an unsolicited software application for the client device from the set of available software applications;
prepare for transmission a set of software applications comprising the recommended unsolicited software application; and
transmit to the client device the prepared set of software applications;
wherein the recommending comprises computing relative software application preferences context relevance among a set of available software applications and selecting for recommendation an unsolicited software application having the highest relative software application preferences context relevance among previously unselected available software applications.

11. A client device comprising:
a network interface unit;
a man-machine interface unit;
a processing unit; and
a memory unit;
said units implementing a user interface, a preload cache, a policy enforcement point, a policy storage, and a context agent, the client device further adapted and configured to:
receive information pertaining to an identified user that is using or that owns the client device, the information comprising context information pertaining to the identified user;
obtain the identified user's current user policy or the identified user's software application usage policy, wherein the current user policy or the software application usage policy identifies one or more conditions for installation of a set of available software applications:
provide, to a server, the context information pertaining to the identified user from which a software application preferences context pertaining to the identified user is derived;
receive, at the client device being used by or owned by the identified user, the set of available software applications comprising an unsolicited software application relevant to the identified user's software application preferences context;
store the unsolicited software application in a preload cache;
wherein the information that the client device is adapted and configured to receive, further comprises a request for a previously unsolicited software application stored in the preload cache;
determine whether a requested software application is in accordance with the obtained current user policy or software application usage policy; and, in response to determining that the requested software application is in accordance with the obtained current user policy or software application usage policy, enable the installation or preloading of the requested software application.

12. A computer program product comprising a computer program and a non-transitory computer readable medium on which the computer program is stored, the computer program comprising computer program code which, when run on a server for provisioning of policy controlled preloading software application to a client device being used by or owned by an identified user, causes the server to:
provide the identified user's current user policy or the identified user's software application usage policy to the client device, wherein the current user policy or the software application usage policy identifies one or more conditions for installation of a set of available software applications;
derive a software application preferences context from metadata pertaining to user-solicited software application or from network-based context information pertaining to the identified user;
based on the derived software application preferences context pertaining to the identified user that is using or that owns the client device, recommend an unsolicited software application for the client device from the set of available software applications;
prepare a set of software applications for transmission, the set of software applications comprising the recommended unsolicited software application; and
transmit to the client device the prepared set of software applications;
wherein the recommending comprises computing relative software application preferences context relevance among a set of available software applications and selecting for recommendation an unsolicited software application having the highest relative software application preferences context relevance among previously unselected available software applications.

13. A computer program product comprising a computer program and a non-transitory computer readable medium on which the computer program is stored, the computer program comprising computer program code which, when run on a client device being used by or owned by an identified user, causes the client device to:
receive information pertaining to the identified user, the information comprising context information pertaining to the identified user;
obtain the identified user's current user policy or the identified user's software application usage policy, wherein the current user policy or the software application usage policy identifies one or more conditions for installation of a set of available software applications:
provide, to a server, the context information pertaining to the identified user from which a software application preferences context pertaining to the identified user is derived;
receive, at the client device being used by or owned by the identified user, the set of available software applications comprising an unsolicited software application relevant to the user's software application preferences context;
store the unsolicited software application in a preload cache;
wherein the information that the client device is adapted and configured to receive, further comprises a request for a previously unsolicited software application stored in the preload cache;

determine whether a requested software application is in accordance with the obtained current user policy or software application usage policy; and in response to determining that the requested software application is in accordance with the obtained current user policy or software application usage policy, enable the installation or preloading of the requested software application.

\* \* \* \* \*